Patented Sept. 28, 1948

2,450,332

UNITED STATES PATENT OFFICE 2,450,332

POLYCARBOXY ESTERS OF DIMERIZED 9,11-LINOLO-DIRICINOLEIN AND METHOD OF MAKING SAME

Melvin De Groote, University City, Mo., assignor to Petrolite Corporation, Ltd., Wilmington, Del., a corporation of Delaware No Drawing. Original application July 13, 1945, Serial No. 604,990. Divided and this application November 5, 1946, Serial No. 707,977

8 Claims. (Cl. 260—405)

This invention relates to certain new chemical products or compounds and to the manufacture of same, my present application being a division of my co-pending application Serial No. 604,990, filed July 13, 1945, now U. S. Patent 2,417,738, issued March 18, 1947.

One object of my invention is to provide new chemical products or compounds that are particularly adapted for use as a demulsifier in the resolution of crude oil emulsions, but which are also adapted for various other uses, as hereinafter described.

Another object of my invention is to provide a practical method of making the said chemical products or compounds.

The new chemical product herein described, particularly when employed as a demulsifier, consists of a partial or fractional ester derived by reaction between a polycarboxy acid or anhydride, such as phthalic acid, and the dimer of what may be most conveniently referred to as 9,11-linolo-diricinolein. The conventional dehydration of castor oil or ricinoleic acid, or some other ester, results in the formation of a diene acid with the probability that two reactions ordinarily go to approximately the same degree. These reactions may be illustrated in the following manner:

Reaction 1

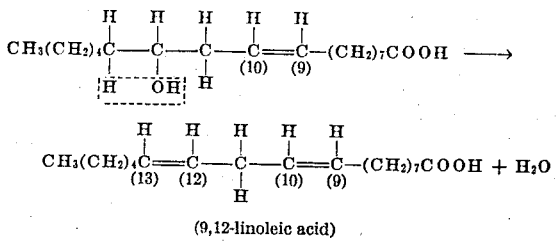

(9,12-linoleic acid)

Reaction 2

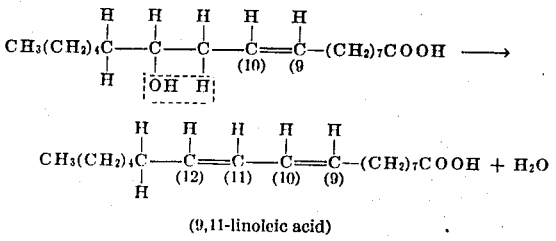

(9,11-linoleic acid)

United States patents which illustrate this procedure are: Patent No. 2,140,271, dated December 13, 1938, Schwarcman; 2,195,225, dated March 26, 1940, Priester; 2,209,065, dated July 23, 1940, Pelikan; 2,212,385, dated August 20, 1940, Brod; 2,226,830, dated December 31, 1940, Priester; 2,226,831, dated December 31, 1940, Priester; 2,246,768, dated June 24, 1941, Ubben; 2,261,663, dated November 3, 1941 Rheineck; 2,336,186, dated December 7, 1943, Nessler; 2,351,444, dated June 13, 1944, Miller.

The mixed isomers may be treated so as to convert the unconjugated isomer into the conjugated isomer. This isomerization reaction may be indicated thus:

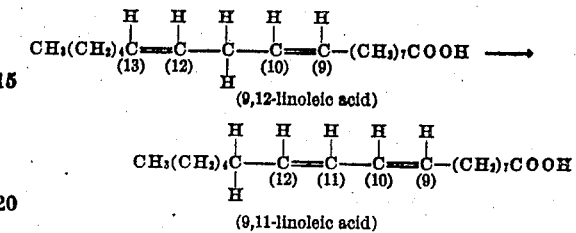

U. S. Patents exemplifying isomerization procedure of the kind indicated, are the following: No. 2,185,414, dated January 2, 1940, McKinney; 2,242,230, dated May 20, 1941, Burr; 2,350,583, dated June 6, 1944, Bradley.

9,11-linoleic acid of approximately 80% to 85% purity is obtainable in the open market and also available in the form of the ethyl or methyl ester.

Ignoring matters of cost, I prefer to prepare the monomeric mixed glyceride from this particular product. Methyl or ethyl ricinoleate, which can be prepared in the usual manner or purchased in the open market, is reacted in the customary manner with glycerol monochlorhydrin, using two moles of the ester for one mole of the chlorohydrin. The reaction may be indicated thus:

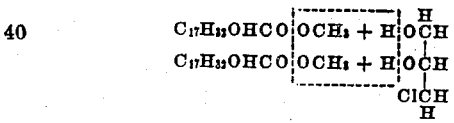

The 9,11-linoleic acid is converted into the anhydrous sodium salt and reacted mole for mole with the above intermediate, in presence of anhydrous alcohol or some other suitable solvent. This reaction may be indicated thus:

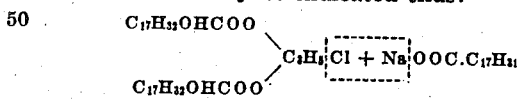

Other alternate procedures may be used, and particularly some in which the percentage of mixed glyceride is not as high in the product obtained by the described procedure, but still sufficiently high for the manufacture of valuable products for the employment of processes herein described.

In regard to the above esterification procedure or alternate procedure, see the comprehensive article entitled "Polyhydric alcohol esters of fatty acids," in Chemical Reviews, volume 3, No. 3, at page 257.

The polymerization of the diene acid is conducted in the same identical manner employed for the polymerization of the methyl ester. The polymerization of the methyl ester is described in various U. S. patents, as, for example: No. 2,325,040, dated July 27, 1943, to Cook et al.; 2,347,562, dated April 25, 1944, Johnston; 2,357,839, dated September 12, 1944, Evans et al.

The dimerization of the methyl ester may be indicated in the following manner:

$$_2CH_3(CH_2)_4(CH=CH)_2(CH_2)_7\underset{\underset{O}{\|}}{C}-OCH_3 \xrightarrow{\text{Heat}}$$

2 moles methyl ester 9,11-octadecadienic acid (originally present and/or formed by isomerization of 9,12 isomer)

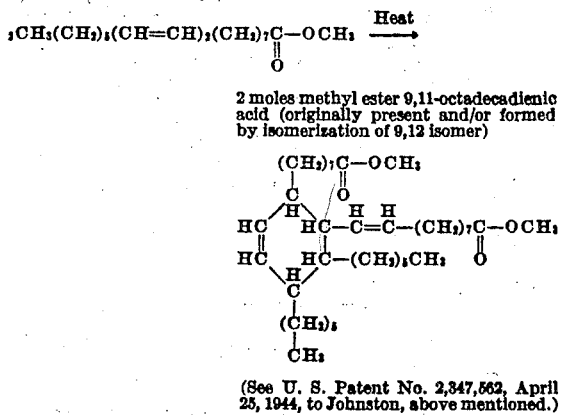

(See U. S. Patent No. 2,347,562, April 25, 1944, to Johnston, above mentioned.)

In polymerization of polyene acid esters it has been found that temperatures between about 250° C. and about 350° C. are suitable for the polymerization. The time required for this polymerization varies not only with the temperature, but with the acid and the particular ester which is used. Generally, a period of from about one-half hour to about 50 hours is suitable, and in most instances, the polymerization may be effected in not over 12 hours. If a conjugated unsaturated ester, such as the methyl ester of oleostearic acid be employed, a sufficient degree of polymerization may be obtained within one-half to one hour at about 300° C., whereas, the methyl linolenates and linoleates generally require from about 5 to 12 hours or more. To speed up the polymerization process, suitable catalysts may be added, examples of which are: fuller's earth (preferably acid-treated), bentonite (preferably acid-treated), stannic chloride, etc. If catalysts be employed, it is sometimes possible to use lower temperatures and/or shorter periods of time than those indicated above. Substantially the same conditions may be used for dimerization, provided however, that they must be below the point where dehydration of the ricinoleic acid radical takes place. In other words, in the present instance the upper temperature of limit is approximately 250° C., and as a result of a somewhat lower temperature, it is sometimes desirable to use a longer time period for isomerization, for instance, a time period as long as twenty-four to forty-eight hours.

Other means for inducing or hastening or catalyzing polymerization of the above described reactants are well known. See, for example, U. S. Patent No. 2,207,686, dated July 9, 1940, to Schwarcman.

In any event, any suitable procedure is used to prepare the mixed glyceride which has the following formula:

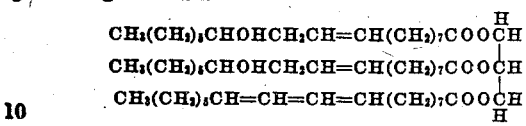

Said mixed glyceride is then dimerized in the manner previously described, to produce the dimer of the following formula:

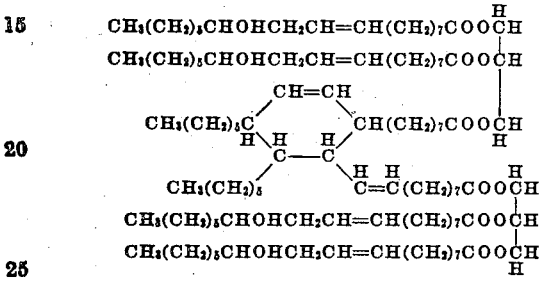

An examination of the preceding formula immediately suggests additional procedures for producing the dimer of the mixed glyceride. For instance, a raw material which can be readily prepared or purchased in the open market, is diricinolein. The formula for such product, ignoring isomeric forms, is, of course:

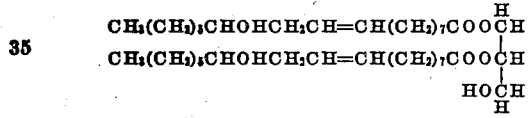

It becomes obvious that if two moles of diricinolein could be reacted with one mole of the dimeric acid which has been previously depicted in the form of a methyl ester, one would then obtain the dimerized mixed glyceride previously described. The objection to such procedure, however, is that reaction cannot be limited to the hydroxyl attached to the glycerol residue, and, in fact, may involve the ricinoleyl hydroxyl radical. Thus, such procedure, although giving fair yields, also gives admixture with other products which preferably are avoided. However, if the methyl ester or ethyl ester of the dimeric acid is used so esterification involves the elimination of the methyl or ethyl alcohol, then and in that event, the reaction appears to be limited largely to involving the glycerol hydroxyl.

Another procedure which immediately suggests itself in the formation of the monomeric mixed glyceride, is the procedure commonly referred to as re-esterification, cross-esterification, or trans-esterification. Such procedure is well known, and in essence, would involve, for example, mixing two moles of triricinolein with one mole of the total or complete glyceride of 9,11-linoleic acid dimer. Such migration of the acyl radicals takes place at a temperature below the pyrolytic point of triricinolein, and in presence of an alkaline catalyst. The suitable temperature is approximately 250° C., or slightly less, and the time required may be comparatively long, for instance, 36 to 72 hours.

In any event, one obtains the dimerized mixed glyceride by any suitable procedure, and the product employed should preferably contain at least 65% or more of the dimerized mixed glyceride; some of the procedures above enumerated will yield a product markedly in excess of this value. Such mixed glyceride, if carefully prepared, has a viscosity approximately that of castor oil, or slightly blown castor oil, a distinctly darker color, and perhaps, a less pleasant odor. The chemical constants, such as molecular weight, iodine number, hydroxyl number and saponification value, approximate the calculated theoretical value. It is to be noted that this intermediate is not claimed herein per se.

Such dimerized mixed glyceride previously described in detail, is subjected to reaction with polybasic carboxy acids.

Polybasic carboxy acids which may be employed in the esterification reaction may be exemplified by phthalic, succinic, malic, fumaric, citric, citraconic, tricarballylic, maleic, adipic, tartaric, oxalic, or the like. The anhydrides, of such polybasic carboxy acids, such as phthalic anhydride, maleic anhydride, etc., are the equivalents of the acids, and in some respects, are even more advantageous than the acids in the production of esters. When reference is made to polybasic carboxy acids, the anhydrides thereof are also included. Other suitable polybasic acids may be prepared by the diene synthesis which involves condensation of alpha-beta, unsaturated acids or anhydrides with compounds containing a conjugated double bond. For example, the condensation of maleic anhydride with alpha-terpinene yields a dicarboxy acid which is suitable. Other polybasic carboxy acids may be prepared similarly by the diene synthesis involving condensation of an alpha-beta, unsaturated monocarboxy acid with a carboxy acid containing a conjugated double bond. For example, crotonic acid may be condensed with abietic acid, which contains a conjugated double bond, to yield a dicarboxy acid suitable for use in the manufacture of the herein contemplated products.

It has been found, however, that of all the acids available, the dicarboxy acids having six carbon atoms or less are particularly preferable. The choice is to use such acids which are cheap and particularly resistant to pyrolysis, such as phthalic acid or the anhydride, maleic acid or the anhydride, citraconic acid or the anhydride, and adipic acid. It is known, of course, that if a dimer of the kind above described is heated with maleic anhydride or the like, or some other dienophile, that a more complicated series of reactions will take place, and this, as a matter of fact, would apply even if the ricinoleyl radical were replaced by an oleyl radical. The present invention is not concerned with this particular variant. Indeed, maleic acid may even add under appropriate conditions to the double bond which has been shown as part of a cyclic structure in a previous representation of the structural formula of the dimerized mixed glyceride.

For convenience then, rather than repeat the above structure, which is rather burdensome, it is sufficient to present a simpler form which may be represented thus:

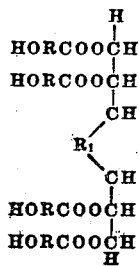

Such formula shows clearly that the dimerized mixed glyceride may serve as a tetrahydric alcohol of fairly high molecular weight and that it may be subjected to reaction in the same way that castor oil, which may be considered a trihydric alcohol, is esterified with various polycarboxy acids, particularly phthalic anhydride, maleic anhydride, citraconic anhydride, and adipic acid. The procedure of reacting castor oil or similar polyhydroxy alcohol esters of hydroxylated fatty acids requires no elaboration. Briefly stated, one pound mole of the dimerized mixed glyceride, for instance, one pound mole of dimeric 9,11-linolo-diricinolein, is mixed with a predetermined amount of the selected polycarboxy acid, for instance, one mole, two moles, three moles, or somewhat less than four moles. The reaction is conducted at any suitable temperature above 175° C. and below the pyrolytic point of either the ricinoleyl radical, or of the polycarboxy acid selected. Insofar that one can employ any number of polycarboxy acids which are resistant to pyrolysis from a practical standpoint, one need only employ a temperature below the pyrolysis of the ricinoleyl radical, i. e., a temperature of approximately 250° C., or slightly less. Such reaction mass is stirred constantly during reaction, and if desired, a very small quantity of a dried inert gas, such as nitrogen, is passed through during the course of reaction. The objection to such procedure is only that if the polycarboxy reactant sublimes, as in the case of phthalic anhydride, some may be lost. There is no need to add the usual esterification catalyst, such as one-tenth to five-tenths of 1% of toluene sulfonic acid, but if added, it appears to hasten the reaction. The time of reaction varies, but approximately six to fifteen hours will serve. The mass should be stirred continuously during reaction. If no inert gas is passed in the mass, then any phthalic anhydride or the like which sublimes, can be scraped from the condenser by a continuous scraper and returned to the reaction mass. Completeness of the reaction can usually be determined by the fact that the cooled reaction mass stays clear, indicating the absence of any reactive polycarboxy acid or anhydride. In any event, a representative sample can be taken and titrated so as to determine the acid value, and it is to be noted that at the end of the reaction, the acid value should approximately indicate that one-half of the dicarboxy acid carboxyls have reacted. The entire process is to produce a fractional or partial ester having at least one and preferably more free carboxyl radicals. As previously pointed out, a simple determination of the acid value denoting the percentage of unreacted carboxyl radicals in the mechanical mixture at the beginning of the reaction and in the chemical compound at the end of the reaction, will serve. To some degree, it is possible that there is some linkage wherein one mole of the polycarboxy reactant involves two moles of the dimer. However, molecular weight determinations on the finished product appear to indicate that there is comparatively a small fraction, if any, of a sub-resinous material involving the polyfunctionality of both the dimerized mixed glyceride and the dicarboxy acid. Obviously, the likelihood for such higher polymer formation increases as the molal ratio of the polycarboxy reactant increases, and other factors come into play, such as higher temperature of reaction, increased time of reaction, etc. This conforms to expectations.

The preferred composition represents such compounds as dimeric 9,11 - linolo - diricinolein mono-acid-phthalate, 9,11-linolo-diricinolein di-acid-phthalate, and similarly, the tri-acid-phthalate, and mixtures of the tri-acid-phthalate and the tetra-acid-phthalate. Of equal interest are the corresponding acid maleates, corresponding acid adipates, and corresponding acid citraconates and succinates. Although further description is unnecessary, it is to be noted that in subsequent examples some of the preferred products are exemplified by illustration and structural formulae which are not intended to refer to any particular isomer.

*Example 1*

One pound mole of dimerized 9,11-linolo-diricinolein is reacted with one pound mole of phthalic anhydride.

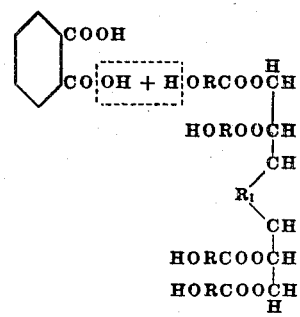

For convenience of depicting the acid, phthalic acid is shown instead of the anhydride. The significance of $R_1$ has been indicated previously. The procedural steps are those previously indicated, but briefly, require nothing more or less than reaction for approximately two to six hours, with constant stirring at about 225° C. to 250° C. A catalyst may be added, such as one-fourth of 1% of toluene sulfonic acid, or dried carbon dioxide may be passed through the mixture, provided safeguards are taken not to lose phthalic anhydride by sublimation.

*Example 2*

Two moles of phthalic anhydride are employed for each mole of the dimer. The conditions of reaction are substantially the same as previously indicated.

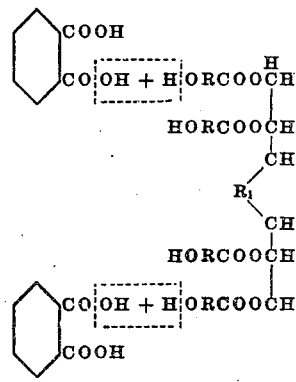

*Example 3*

The molar proportion of phthalic anhydride is increased so as to introduce approximately 3½ moles of phthalic anhydride per mole of dimer.

*Example 4*

Adipic acid is used instead of phthalic anhydride in Examples 1 to 3, preceding.

*Example 5*

Succinic acid is used instead of phthalic anhydride in Examples 1 to 3, preceding.

*Example 6*

Diglycollic acid is used instead of phthalic anhydride in Examples 1 to 3, preceding.

It is my preference to use heat resistant dicarboxy acids having not over 8 carbon atoms, and particularly those that are saturated as distinguished from unsaturated ones, such as maleic acid, or maleic anhydride, citraconic acid or citraconic anhydride. The reason for this latter preference is simply that as more drastic conditions are employed, particularly for introduction of higher molal amounts of the dicarboxy acid, maleic acid or the anhydride, or citraconic acid, or the anhydride, may undergo polymerizations by addition or rearrangement, as distinguished from conditions which normally eliminate water or some other small molecule, provided such reactant employing a carboxyl is used. If, however, the reactions are conducted cautiously so as to avoid any undue complications, one obtains products of equal value from such materials as maleic anhydride, or citraconic anhydride.

The new chemical products or compounds herein described, are useful for other purposes in addition to demulsification. They may be added, for example, to metal polishes to give a slight acidity. They may also be employed as a plasticizer in resin formation, where the acidity of the carboxyl is not objectionable. I have found that the chemical compounds herein described, which are particularly desirable for use as demulsifiers, may also be used as break inducers, in doctor treatment of the kind intended to sweeten gasoline. (See U. S. Patent No. 2,157,223, dated May 9, 1939, to Sutton.)

I am aware that valuable products suitable for use as wetting agents, etc., may be prepared by considering the acidic fractional esters herein contemplated as intermediates. Such intermediates can be subjected to oxyethylation with ethylene oxide, propylene oxide, butylene oxide, glycide and methylglycide, so as to give water-soluble products. Similarly, such intermediates may be reacted with hydroxylated tertiary amines, particularly triethanolamines, to give acylated derivatives having particularly valuable properties for the purposes enumerated in the present paragraph.

Attention is directed to the fact that the compounds herein contemplated, although derived essentially from one mole of the dimer, may actually represent sub-resinous materials, in which two or three moles of the dimer are joined by a polycarboxy acid radical. It becomes obviously difficult, if not impossible, to present a formula depicting such more elaborate and more complicated aspect of the invention. However, in regard to the simpler aspect, that is, derivatives of the dimer, it is to be noted that structural formulae present an adequate portrayal.

As has been previously pointed out, the mixed ester herein contemplated for dimerization is referred to as 9,11-linolo-ricinolein. This nomenclature appears to conform with that commonly employed in designation of mixed glycerides having one linoleyl radical, although from more formal nomenclature, it is possible that the expression "9,11-linoleyl-diricinolein" would be appropriate, since in essence a hydrogen atom of diricinolein has been replaced by the 9,11-linoleyl radical.

Having thus described my invention, what I claim as new and desire to secure by Letters Patent is:

1. An acidic partial ester of a polycarboxy acid with dimerized 9,11-linolo-diricinolein.
2. An acidic partial ester of a dicarboxy acid with dimerized 9,11-linolo-diricinolein.
3. An acidic partial ester of a dicarboxy acid having less than 9 carbon atoms with dimerized 9,11-linolo-diricinolein.
4. An ester having at least one ricinoleyl hydroxyl hydrogen atom of

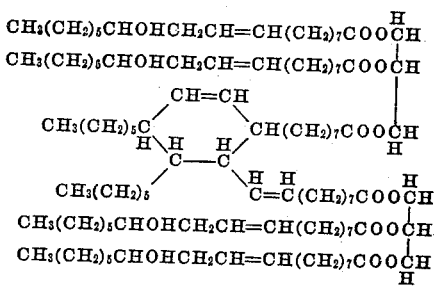

replaced by the radical —$OCR_2COOH$ of the dicarboxy acid $HO.OCR_2COOH$ in which $R_2$ is an organic radical having less than 7 carbon atoms linked to the COOH groups through different carbon atoms.

5. An ester having more than one ricinoleyl hydroxyl hydrogen atom of

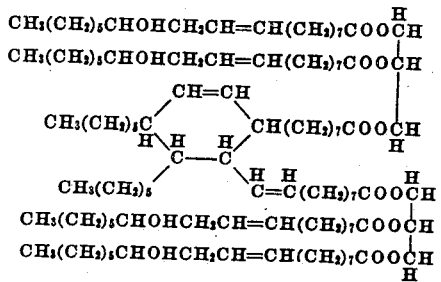

replaced by the radical —$OCR_2COOH$ of the dicarboxy acid $HO.OCR_2COOH$ in which $R_2$ is an organic radical having less than 7 carbon atoms linked to the COOH groups through different carbon atoms.

6. The acidic fractional ester of claim 5, wherein $HO.OCR_2COOH$ is phthalic acid.
7. The acidic fractional ester of claim 5, wherein $HO.OCR_2COOH$ is adipic acid.
8. The acidic fractional ester of claim 5, wherein $HO.OCR_2COOH$ is diglycollic acid.

MELVIN DE GROOTE.

REFERENCES CITED

The following references are of record in the file of this patent:

UNITED STATES PATENTS

| Number | Name | Date |
|---|---|---|
| 2,027,467 | Brubaker | Jan. 14, 1936 |
| 2,310,395 | Carruthers | Feb. 9, 1943 |
| 2,416,485 | Lasher | Feb. 25, 1947 |